(12) United States Patent
Holahan

(10) Patent No.: US 7,638,150 B2
(45) Date of Patent: Dec. 29, 2009

(54) PROCESS FOR PREPARING CONCENTRATE THICKENER COMPOSITIONS

(75) Inventor: John L. Holahan, University City, MO (US)

(73) Assignee: Simply Thick LLP, Clayton, MO (US)

( * ) Notice: Subject to any disclaimer, the term of this patent is extended or adjusted under 35 U.S.C. 154(b) by 889 days.

(21) Appl. No.: 10/485,879

(22) PCT Filed: Aug. 2, 2002

(86) PCT No.: PCT/US02/24525

§ 371 (c)(1),
(2), (4) Date: Feb. 2, 2004

(87) PCT Pub. No.: WO03/011051

PCT Pub. Date: Feb. 13, 2003

(65) Prior Publication Data

US 2004/0197456 A1    Oct. 7, 2004

(51) Int. Cl.
*A23L 1/05* (2006.01)
(52) U.S. Cl. ............... 426/2; 426/589; 426/594; 426/597; 426/592; 426/66; 426/590; 426/599; 426/580
(58) Field of Classification Search ............... 426/579, 426/573, 578, 658, 661, 2
See application file for complete search history.

(56) References Cited

U.S. PATENT DOCUMENTS 3,201,317 A    8/1965  Miller
3,773,752 A   11/1973  Buchanan et al.
3,949,104 A    4/1976  Cheng et al.
4,010,071 A    3/1977  Colegrove
4,107,343 A    8/1978  Petricca
4,135,979 A    1/1979  Corley et al.
4,229,825 A   10/1980  Guidoux
4,252,835 A    2/1981  Maerker et al.
4,269,974 A    5/1981  Wintersdorff
4,299,825 A   11/1981  Lee
4,391,836 A *  7/1983  Chiu ........................ 426/578
4,427,681 A    1/1984  Munshi
4,479,973 A * 10/1984  Holley ...................... 426/573
4,623,552 A * 11/1986  Rapp ........................ 426/575

(Continued)

FOREIGN PATENT DOCUMENTS

DE    19918210 A    11/2000

(Continued)

OTHER PUBLICATIONS

Federal Register; vol. 58, No. 164; Thursday, Aug. 26, 1993/Rules and Regulations (8 pages total).

(Continued)

*Primary Examiner*—Steven L Weinstein
*Assistant Examiner*—Vera Stulii
(74) *Attorney, Agent, or Firm*—Polster Lieder Woodruff & Lucchesi LC

(57) ABSTRACT

A process for thickening liquid food and/or medications of people with swallowing problems which involves dilution of a concentrate thickener paste which has been thickened to several times its normally useful and cost-effective levels. The approach is beneficial in formulations intended for radiological evaluations of people with swallowing problems including those persons suffering from dysphagia.

26 Claims, 2 Drawing Sheets

U.S. PATENT DOCUMENTS

| | | | |
|---|---|---|---|
| 4,654,086 A | 3/1987 | Baird et al. | |
| 4,670,550 A | 6/1987 | Bleeker et al. | |
| 4,671,966 A | 6/1987 | Giddey et al. | |
| 4,774,093 A | 9/1988 | Provonchee et al. | |
| 4,828,724 A | 5/1989 | Davidson | |
| 4,855,156 A | 8/1989 | Singer et al. | |
| 4,859,484 A | 8/1989 | Bielskis et al. | |
| 4,894,335 A | 1/1990 | Peignier et al. | |
| 5,202,146 A | 4/1993 | Singer et al. | |
| 5,251,699 A | 10/1993 | Lau et al. | |
| 5,270,459 A | 12/1993 | Shatzman et al. | |
| 5,300,302 A | 4/1994 | Tachon et al. | |
| 5,338,561 A | 8/1994 | Campbell et al. | |
| 5,362,713 A | 11/1994 | Westland et al. | |
| 5,385,748 A | 1/1995 | Bunger et al. | |
| 5,536,825 A | 7/1996 | Yeh et al. | |
| 5,633,028 A | 5/1997 | Wong | |
| 5,648,093 A | 7/1997 | Gole et al. | |
| 5,654,027 A | 8/1997 | Chalupa | |
| 5,811,148 A | 9/1998 | Chiu et al. | |
| 5,837,272 A | 11/1998 | Fierro, Jr. et al. | |
| 5,869,029 A | 2/1999 | Graff-Andersen et al. | |
| 5,932,235 A | 8/1999 | Ninomiya et al. | |
| 5,997,907 A | 12/1999 | Goswami et al. | |
| 6,001,408 A | 12/1999 | Dudacek et al. | |
| 6,007,848 A | 12/1999 | Hendrick et al. | |
| 6,033,712 A | 3/2000 | Greenshields et al. | |
| 6,033,713 A | 3/2000 | Sheldon | |
| 6,036,982 A | 3/2000 | Lehmberg et al. | |
| 6,139,895 A * | 10/2000 | Zablocki et al. | 426/573 |
| 6,149,962 A | 11/2000 | Loh et al. | |
| 6,162,471 A | 12/2000 | Sheldon | |
| 6,174,549 B1 | 1/2001 | Greenshields et al. | |
| 6,200,623 B1 | 3/2001 | Dudacek et al. | |
| 6,277,395 B1 | 8/2001 | Fukui et al. | |
| 6,455,090 B1 * | 9/2002 | Uzuhashi et al. | 426/573 |
| 6,458,395 B1 | 10/2002 | Emoto | |
| 6,461,589 B2 | 10/2002 | Robbins | |
| 6,559,187 B2 | 5/2003 | Chandran et al. | |

FOREIGN PATENT DOCUMENTS

| | | |
|---|---|---|
| EP | 0620012 A | 4/1994 |
| EP | 0620012 A1 | 4/1994 |
| EP | 1 046 347 A1 | 7/1999 |
| EP | 1078981 A | 2/2001 |
| JP | 06040950 A | 2/1994 |
| JP | 07274915 A | 10/1995 |
| JP | 10131478 | 5/1998 |
| JP | 10229517 | 7/1998 |
| JP | 11-187827 A | 7/1999 |
| JP | 11-318356 A | 11/1999 |
| JP | 2000041549 A1 | 2/2000 |
| JP | P200041594 A | 2/2000 |
| JP | 2000135070 A | 5/2000 |
| JP | 2000325041 A | 11/2000 |
| WO | WO-99/25208 A | 5/1999 |
| WO | WO-99/34690 | 7/1999 |
| WO | WO 01/15743 A2 | 3/2001 |
| WO | 03011051 | 2/2003 |

OTHER PUBLICATIONS

Xanthan gum, G, Sworn, Monsanto (Kelco Biopolymers, Tadworth), in Handbook of Hydrocolloids, ed. G.O. Phillips and P. Williams, Woodhead Publishing Ltd, Cambridge, England, Jul. 2000, pp. 103-115. Available at: http://docencia.izt.uam.mx/epa/quim_alim/tareas/xantana.pdf.

Australian Examiner's report No. 4 on patent application No. 2002324592 dated Mar. 28, 2008 (4 pgs.).

Castellanos, V. H., PHD, RD; Butler, E., RD; Gluch, L., RD; Burke, B., RD, Use of Thickened Liquids in Skilled Nursing Facilities, Jrnl of the Amer Dietetic Assoc, Aug. 2004.

Compiled by Andrea Castrogiovanni, Communication Facts Special Populations: Dysphagia, American Speech-Language-Hearing Assoc. 1999 Edition.

Deis, Ronald C., Ph.D., Dietary Fiber: A Healthy Discussion, Weeks Publishing Co, Jan. 1999, Design Elements Online, http://www.foodproduct design.com/archive/1999/0199de.html.

Levine, M.S., Imaging Recommendations for Patients With Dysphagia, American College of Radiology ACR Appropriateness Criteria, http://www.acr.org.

Kuhlemeier, K.V., PhD, MPH, Epidemiology and Dysphagia, Dysphagia 9:209-217 (1994), Copywrite Springer-Vertag New York Inc. 1994.

Compiled by Andrea Castrogiovanni, Communication Facts Special Populations: Dysphagia—2001 Edition, ASHA http//professional.asha.org/research/dysphagia.htm.

NYEEI: Otolaryngology: Faqs About Swallowing Disorders, Online, NYEEI: http://www.nyee.edu/faqlist.html?tablename=faz&key=48 &print=.

Hunt, V., Walker, F., Dysphagia in Huntington's Disease, Journal of Neuroscience Nursing, Apr. 1989, vol. 21, No. 2, pp. 92-95.

Edmonds, C., M.R.C.P., D.P.M., Huntington's Cora, Dysphagia and Death, The Medical Journal of Australia, Aug. 6, 1966.

Compiled by Andrea Castrogiovanni, Special Populations: Stroke—2002 Edition, ASHA Resource Center, http://professional.asha.org/research/dysphagia.html.

Leopold, Norman A.., Do, Kagel, Marion C. MA; Dysphagia in Huntington's Disease, Arch Neurol—vol. 42, Jan. 1985, pp. 57-60.

Dept of Health and Human Services, FDA; 21CFR Part201 (DKT 90N-0200) Rin 0905-AAS06, Warning Statements Required for Over the Counter Drugs Containing Water Soluble Gums as Act.

U.S. Food and Drug Administration Center for Food Safety and Applied Nutrition [Online] http://www.cfsan.fda.gov/-dms/ds-medfd.html Aug. 24, 2001.

Dept of Health and Human Services, FDA; 21CFR Ch.I, Dkt 96N0364 RIN0905-AD91, Regulation of Medical Foods:Advance Notice of Proposed Rulemaking, Federal Register,vol 61, Nov. 29, 1996.

Compiled by a Castrogiovanni, Communication Facts: Special Populations: Dysphagis—2002 Edition, ASHA Resource Center, http://professional.asha.org/research/dysphagia.html.

Lotong, V.; Texture and Flavor Characteristics of Beverages Containing Commercial Thickening Agents for Dysphagia Diets, Journal of Food Science, vol. 68, Nr. 4, 2003 1537-1539.

PCT Notification of Transmittal of the International Search Report or the Declaration, International Application No. PCT/US02/24525, Date of Mailing Dec. 2, 2002; 6 pgs.

English Translation of Published Japanese Patent Application No. JP11187827A (16 pgs.) Patent pub. date—Jul. 13, 1999.

Concentrated Gellan Gum Gel (5%) Suitable to Gel Various Other Systems (A Universal Gelling Agent). XP-002305761, p. 1, 1996.

International Search Report, 02759246.8-1221-US0224525, P71214EP00, 4 pgs, Aug. 12, 2004.

* cited by examiner

PROCESS FOR PREPARING CONCENTRATE THICKENER COMPOSITIONS

CROSS REFERENCE TO RELATED APPLICATIONS

This Application claims the benefit of Provisional Application No. 60/309,764, filed Aug. 2, 2004, and PCT International Patent Application Number PCT/US02/24525 filed Aug. 2, 2002, which are hereby incorporated by reference in their entirety.

BACKGROUND OF THE INVENTION

The present invention relates to concentrate thickener compositions. More particularly the invention relates to xanthan gum concentrate compositions.

Swallowing problems in humans include difficulty in swallowing, inability to swallow, and discomfort in swallowing. These problems are collectively termed dysphagia. Dysphagia is a common unfortunate secondary condition that accompanies many primary human disease states such as stroke, multiple sclerosis, asperger syndrome, esophageal cancer, laryngeal cancer, chagus disease cystic fibrosis, Huntington's chorea, amyotrophic lateral sclerosis, Parkinson's disease, Riley-Day syndrome, scleroderma, and Alzheimer's disease. In some instances dysphagia occurs due to a birth defect. In pre-term infants, dysphagia may occur simply because the musculature and anatomy involved in swallowing has not yet fully developed.

Dysphagia is pervasive as between about 5 and about 15 million people in the United States suffer from dysphagia. People with dysphagia generally lack proper muscle control and coordination to properly seal the windpipe or they lack the ability to properly propel the bolus of food and/or beverage to the stomach. If this condition goes unnoticed, sufferers are prone to foodstuff(s) and beverages going into the sufferer's lungs rather than being routed properly to their stomach. When routing to the lungs occurs, the patient sufferer is at increased risk for growing unhealthy bacteria in the lungs which raises the prospect of aspiration pneumonia (with its accompanying attendant risks and hospitalization) and/or even fatal asphyxiation.

About 30% to about 50% of persons with dysphagia would benefit from a thickened diet. Thin fluids like water move so rapidly through the human swallowing process and they have the least body or texture. Controlling the bolus with these fluids can be very difficult. Any delayed or slowed movement and/or coordination during the swallowing process will more likely be a problem with a thin fluid because it moves so quickly through the mouth and into the throat. The lack of body or texture means that thin fluids are less likely to create the stimulation necessary for proper swallowing in people with dulled swallowing sensation. By thickening fluids intended to be eaten by a person afflicted with dysphagia, it is possible to slow the progress of the fluid through the throat, to produce a bolus that is easier to control, and/or to increase the body or texture of the fluid to increase the likelihood of generating the necessary stimulation for proper swallowing. A major benefit of such thickened fluids and thickened compositions is that when any fluid is left behind in the throat, its thickness will resist flowing into the windpipe. Future swallows can then move the fluid that was left behind into the stomach.

In institutions and homes where beverages are prepared for persons with dysphagia the mixing equipment used is typically less than ideal. Hand mixing with forks, spoons, stirrers, whisks, etc. is common. Dispersion is also not ideal. The powder is often measured, dumped into the container and then mixing started. At best, some people will add the powder while mixing: Rapid and efficient hydration is nearly impossible.

Typical dry powder products include Thick-It® (Precision Foods, St. Louis, Mo. USA), Thicken Up® (Novartis Nutrition, Minneapolis, Minn. USA), and Thick & Easy® (Hormel Healthlabs, Austin, Minn. USA) dry powder thickeners. By using agglomerated forms and/or mixing them with other non-clumping powders, most of the powder forms available on the market are designed to reduce clumping and to be more likely to efficiently hydrate with mixing by hand. As will be demonstrated later, these powders do not appear to rapidly become completely hydrated. They dramatically continue to increase in viscosity for at least 90 minutes. In addition, these products adversely affect the taste and appearance of beverages so they are less appetizing to patients. For example, water thickened with any of the three products above will be white in color and taste very starchy. Also, beverages like soda pop, human breast milk, beer and wine can not be effectively thickened with these powders. Carbonated beverages foam almost uncontrollably when these powders are added. Human breast milk contains enzymes that rapidly break these powders down. And they do not effectively thicken alcoholic beverages.

Dry powder has a potential for accidental ingestion prior to dissolution. Ingestion of dry powder can lead to swelling and blockage of the throat (Federal Register Aug. 26, 1993, pp. 45194-45201). In its final ruling on the labeling of over-the-counter drugs, the United States Food and Drug Administration clearly indicates that dry thickeners in powdered form are a risk for causing esophageal obstruction. Adding to the risk, some of the patients with dysphagia have impaired decision making as a result of their primary disease.

Pre-thickened water, juices, and tea are available from several manufacturers. For example, Thick & Easy® (Hormel Healthlabs, Austin, Minn. USA), NUTRA/Balance™ (Ross Products, Columbus, Ohio USA) and Resource® (Novartis Nutrition, Minneapolis, Minn. USA) nrc-thickened products. Pre-thickened beverages have only a limited beverage selection which includes little more than water, dairy (milk), apple juice, orange juice, cranberry juice, and tea and do not come in all three thicknesses used by the industry. Using pre-thickened beverages is an imperfect solution. Their use will still require the use of powder -either to increase beverage variety or to achieve all of the standard industry thicknesses. The taste and visual properties of pre-thickened beverages does little to improve on the powders. For example, most pre-thickened water has lemon flavor added to it to try and hide its unpleasing taste.

Current approaches to meeting the needs of people with dysphagia fall short.

SUMMARY OF THE INVENTION

In one aspect a process is provided for preparing thickener in a concentrate form that will be easily dispersed by fork or eating utensil or any other simple method of agitation such as shaking by hand or by machine. The thickener concentrate consistently and rapidly thickens most fluids that a patient with dysphagia would desire or have a need to consume. This process provides a food thickener that is more palatable and more visually appealing, that is safer to have in the presence of patients with impaired decision making.

More specifically a process is provided for thickening a liquid food which comprises admixing an effective amount of an aqueous concentrated xanthan gum thickener composition with a liquid food which is capable of being thickened by a concentrated xanthan gum thickener composition.

In another aspect, an effective treatment for dysphagia is provided which comprises feeding a concentrate thickener composition contained within a food to a patient having the condition of dysphagia wherein the thickened liquid comprises a swallowable food.

In another aspect, a system for operating a medical facility is provided which possesses the capability of successfully treating persons afflicted with dysphagia wherein the system provides a thickened food(s) to a patient(s), wherein the thickened food(s) comprises a concentrate thickener composition.

In another aspect, a method for caring for a dysphagia patient at home or in an institution is provided by providing a thickened food of this invention wherein the thickened food comprises a concentrate thickener composition.

BRIEF DESCRIPTION OF THE DRAWINGS

Table A shows changes in actual viscosity in centipoises vs. time for human breast milk thickened with a currently available commercial product and a composition of the present invention.

DETAILED DESCRIPTION OF THE INVENTION

Figure 1:
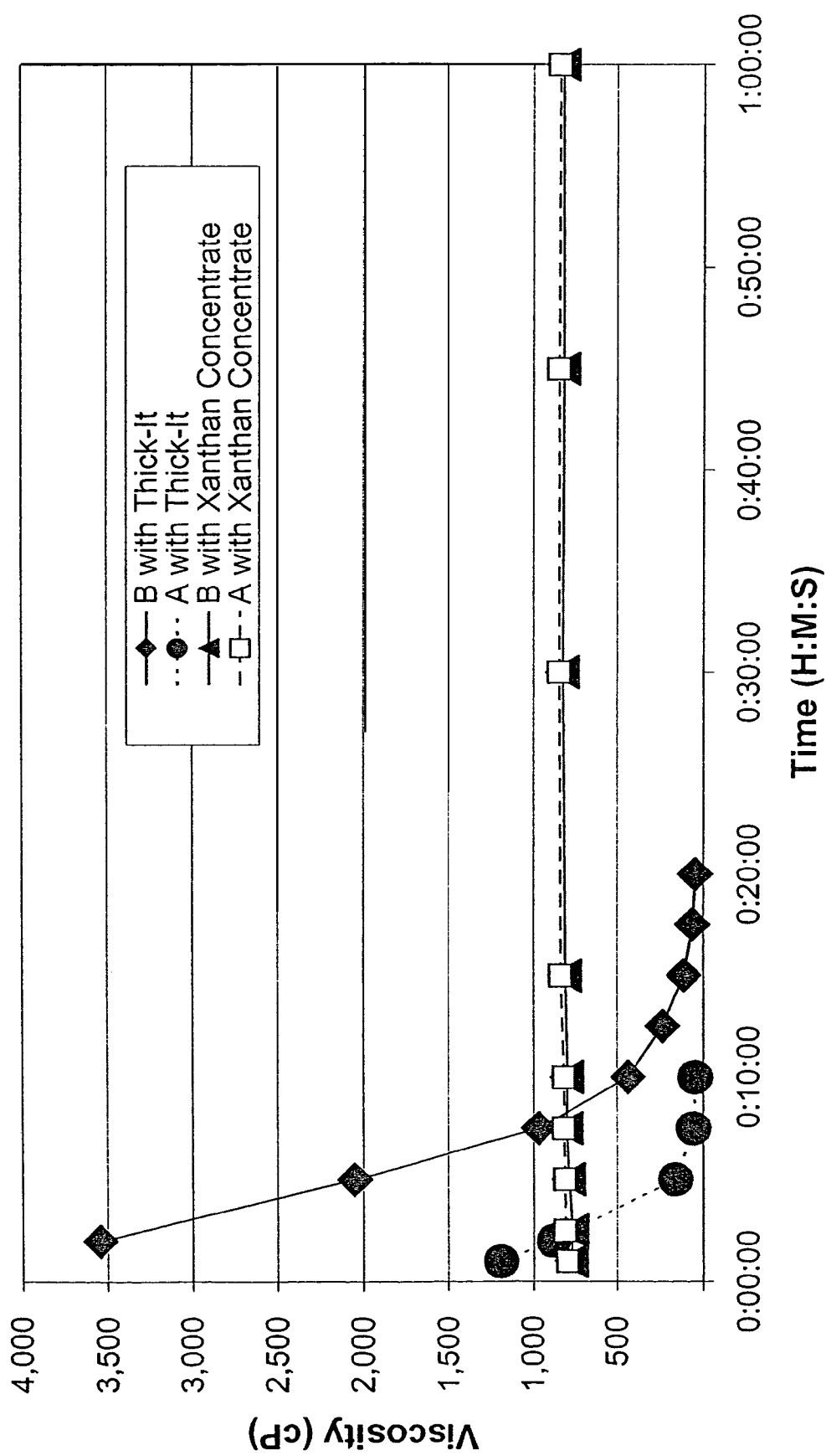
FIG. 1 graphically illustrates changes in actual viscosity in centipoises vs. time for human breast milk thickened with a currently available commercial product and a composition of the present invention.

In accordance with an embodiment of the invention, an admixture comprising a concentrate of thickener is prepared from thickener and water. In an exemplary method the thickener is xanthan gum. Any quality water may be employed; however, an exemplary embodiment includes tap potable water.

In an aspect, a thickener or combinations thereof may be employed. Illustrative and nonlimiting examples of such thickeners are alginates (sodium, potassium, or ammonium salts thereof), carrageenan, glactomannans such as guar gum, locust bean gum, and/or carob bean gum, cellulosics such as sodium carboxymethylcellulose sodium, hydroxypropyl cellulose, hydroxypropylmethyl cellulose, food starches such as corn starch, potato starch, and/or rice starch, xanthan gum and combinations thereof. In an aspect, these may be suitably employed as a treatment for dysphagia which comprises feeding a concentrate thickener composition contained within a food to a patient having the condition of dysphagia. The choice of industrial food thickener employed in the thickener concentrate may be, but does not have to be, specifically selected to provide benefits over current products in terms of taste, clarity, and the selection of beverages to be thickened.

In a preferred aspect, the thickener selected comprises xanthan gum.

As used herein the term "liquid food" includes a food, liquid in appearance, entirely or in part based on water, a liquid nutrient, food containing unbound liquid, liquid medication or food.

The amount of thickener employed in a concentrate thickener will depend greatly on the specific thickener chosen, its specific thickening properties, and the processing equipment employed. In general, the amount employed will be between about 1 and about 10% thickener by weight. Although most typically the amount employed will be between about 1 and about 5% thickener by weight.

As the concentration may vary depending on the equipment and the thickener employed, a sufficient quantity of thickener powder for the concentrate thickener being prepared is admixed with water in a suitable mixing vessel. A preferred mixing vessel comprises a container which is of a size accommodating the amounts of thickener powder and water desired to be suitably mixed. The vessel typically is a commercially sized tank, the particulars of which are not critical and may or may not include a cover, a particular shape, the presence of baffles, and/or a heat jacket. Other suitable useful mixing vessels include a drinking cup, bowls, household containers which can be open or closed top, a kitchen top mixer system, as well as any suitably sized container which will accommodate the amount of water and thickener to be suitably admixed.

Generally, the temperature of the water is not critical to the preparation of the concentrate thickener and may include, without limitation hot, cold, or room temperature water. With some particular thickeners, the inherent properties will make the choice of temperature more critical than it is with others.

As necessary or desired, minor components such as acids, bases, acidulates, chelating agents, flavors, colors, vitamins, minerals, sweeteners, insoluble foods and/or preservatives may be incorporated into the thickener and water admixture at any appropriate point during the preparation. It is understood that such minor components will likely be present in minor amounts and concentrations, i.e. a non-substantial amount as relates to thickening.

In an exemplary embodiment, depending on the specific admixing equipment used and the appropriate handling of the materials the time needed for admixing the thickener concentrate is in the range from about 2 minutes to about 180 minutes and preferably from about 5 minutes to about 60 minutes although greater and lesser times may be employed if desired or necessary.

Optionally, as necessary or desired, the thickener concentrate may be treated to provide shelf stability. Most commonly, but not limiting, the treatment is heat in combination with one or more of the minor components mentioned above.

The packaging of the thickener concentrate is not critical as long as it delivers an effective amount of concentrate to thicken a liquid food to a thickness effective for a person afflicted with dysphagia. Illustratively, packaging may be totes, bins, foil pouches, buckets, bags, syringes or the like.

If desired, use of a thickener concentrate will facilitate in-line mixing and preparation of thickened beverages in a beverage dispenser or container. Such a system would include a metering device and an in-line mixing system to dispense thickened beverages. It could also be designed to dispense thickened or non-thickened beverages at the turn of a switch.

In an aspect, the thickener concentrate is an effective thickener for liquid foods.

An effective amount of the aforedescribed thickener concentrate is admixed with a liquid food which illustratively is selected from at least one of milk, human breast milk, cow's milk, soda, coffee, tea, juice (lemon, citrus, orange, apple), alcohol (beer, wine, or mixed drinks with less than about 20% alcohol) water, nutritional supplements, mixtures thereof and the like or a soup, broth, or food puree and the like.

As employed herein the term "juice" includes puree, fruit juices including orange juice, vegetable juice and apple juice strained and unstrained, concentrated and fresh.

Suitable vessels to effectively admix the thickener concentrate and the liquid food include drinking cups, coffee cups, bowls, household containers which can be open top or closed top, a kitchen blender, a kitchen top mixer system, as well as any suitably sized accomodable container which will accommodate the materials to be admixed. Suitable instruments to carry out the admixing include forks, spoons, knives, hand mixers, kitchen blenders, kitchen top mixers, whisks, and any other appropriate agitation devices. Particularly suitable mixing containers have a lid or cover that can be attached to the container to allow the liquid food and thickener concentrate to be shaken together with containment.

In an exemplary process, the amount of thickener concentrate employed in the admixture is that amount which provides a thickened liquid food which is capable of being consumed by effectively swallowing by a person afflicted with dysphagia.

In an exemplary process, the amount of time employed in the immediately aforedescribed admixing is in the range from about 0.01 to about 3 minutes and preferably from about 0.01 minutes to about 1.5 minutes.

Advantageously the amount of mixing time is of an order of time such that staffing in hospitals, skilled nursing facilities, nursing homes, and/or retirement homes are able to more comfortably accommodate. Also advantageously the thickened liquid food is fully thickened once the concentrate is fully diluted. No standing time is necessary as the polymer dissolution was completed during the preparation of the concentrate. These invention advantages are improvements over the current products which require a two step process during the preparation of the final foodstuff which combines mixing and standing time. These also take from about three minutes and as long as about 30 minutes or more to fully and properly thicken the liquid food.

An advantage with the inventive compositions is that they are safer to eat without adding any further liquid to them and they are safer to leave in the presence of persons with impaired mental judgment. Although certainly very viscous, consumption of the thickener concentrate without dilution does not present a choking hazard. Dry powders put in the mouth and/or attempted to be swallowed before dissolving could present a danger to a patient with impaired mental judgment. In many facilities, open containers of powder are left on tables or in rooms or individual sized packets are served on trays. If a caregiver is somehow distracted, an impulsive eater, like those, as a non-limiting example, one afflicted with Huntington's chorea, could quickly try to consume the dry powder, at serious risk. Because they are completely hydrated, the compositions of this invention face no such problems.

Another advantage of this approach to thickening liquid foods is the consistency of preparation. When using dry powders for thickening at home or institutions, there are several factors which contribute to the variability of preparations from a dry powder.

First, most of the thickeners currently used are agglomerated products that are measured by volume. Since balances are not commonly available, solutions are prepared via the most typical and convenient means available—measuring the product by volume (i.e. 2 tablespoons per four ounces of fluid) with normal household measuring spoons. There is an unfortunate flaw in this approach because settling in the container during shipping and the breakdown of agglomerates from the scooping and leveling action of measuring each serving will tend to cause variability in the bulk density of the powder from the top to the bottom of the container. Thickness is typically logarithmically related to thickener concentration so small changes in concentration can have large differences in the thickness achieved.

Second, the manner of addition is uncontrolled and varies. Poor product addition leads to more clumping of the powder. This leads to less complete hydration for a given amount of mixing.

Third, the mixing time is an uncontrolled yet highly relevant factor. Mixing longer achieves complete hydration. However, most people do not mix long enough to achieve complete hydration. There are other activities, duties and/or patients to attend to, so they stop mixing when the solution is "thick enough". However, unhydrated particles continue to swell and thicken. This changes the final thickness as time passes and can lead to substantially over-thickened liquid foods that have to be eaten with a spoon rather than poured.

Fourth, hydration characteristics of thickeners from dry powders typically vary in different fluid environments. For example, the presence of calcium ions in a liquid food like milk may make it nearly impossible for a particular thickener to hydrate in a reasonable time period even though it hydrates rapidly in water. Since each liquid food to be thickened represents a slightly different environment, there may be differences in thickness and in time to hydrate between different liquid foods.

The thickener concentrates of this invention overcome these aforementioned problems. The thickener concentrates of this invention are delivered to the end user fully, completely, and totally hydrated, and will not settle or separate when shipped. Its density will not change over time and is stable. Consequently the same volume of thickener concentrate will thicken a liquid food to the same level of thickness whether the thickener concentrate is from the top or the bottom of a container. Liquid foods thickened by a thickener concentrate will not continue to thicken after preparation. Since the thickener is already hydrated in the thickener concentrate, any concern over the fluid environment and its impact on hydration time is eliminated. The step of preparing thickness concentrates is quite beneficial.

A radiological technique known commonly as the modified barium swallow is used to diagnose and to make therapeutic recommendations on thickened diets to those patients afflicted with dysphagia. Currently hospitals or nursing homes or mobile diagnostic units prepare the test solutions in their own manner. There is little standardization on the thickness of these solutions. There are no means in place to ensure that the mealtime preparations served to diagnosed patients actually are the same thickness as the test preparations.

The thickener concentrate compositions of the present invention provide the opportunity to link the thicknesses prepared during the modified barium swallow to what is prepared in food service and/or bedside and/or at home. The thickener concentrate compositions of the present invention reduce the variability of final thickness in different liquid foods and reduce the variability of mixing technique. The elimination of clumping and mixing time factors will reduce the variability between what happens during a modified barium swallow and in food service and/or bedside and/or at home for actual consumption.

Another common diagnostic technique of dysphagia is the fiberoptic endoscopic evaluation of swallow. In this technique, an endoscope is insert through the patient's nasal passage into the throat to directly observe the patient's swallow function. In an aspect, thickening compositions of the present invention can be used to thicken test preparations used in this evaluation technique.

Although many thickeners are suitable for use in the present invention, the preferred thickener is xanthan gum. Xanthan gum is manufactured and sold by CP Kelco of Wilmington, Del. USA as the Keltrol® family of products, Rhodia Food Ingredients of Cranbury, N.J. as the Rhodigel® family of products, and Archer Daniels, Midland Company of Decatur, Ill. USA. Xanthan gum is a microbial polysaccharide produced by a pure culture aerobic submerged fermentation of xanthomonas campestris. Xanthan gum is comprised of a backbone of 1,4 linked D-glucose with trisaucharide side chains on alternating anbydroglucose units. The side chains are comprised of a glucuronic acid residue between two mannose units. Typically, xanthan gum forms cloudy solutions in water. Examples of useful xanthan gums include those such as Keltrol®, Keltrol® F, Rhodigel®, Keltrol® T, Keltrol® RD, and Rhodigel® Clear xanthan gums. Xanthan gum is typically available as a powder of varying suitable particle sizes.

As used herein the term "xanthan gum" includes xanthan gum and clarified xanthan gum in all different powder forms and mesh sizes.

In an exemplary process, xanthan gum and water are effectively admixed to provide a concentrate xanthan gum thickener having about 2% to about 5%, specifically about 3.5% to about 4.5% and more specifically about 3.6% to about 4.3% xanthan gum content. The xanthan gum concentrate has the visual appearance and physical consistency of a thick paste or jelly, similar to hair gel, lotions, and honey at about (72° F.) room temperature.

Employing the preferred xanthan gum concentrate to thicken liquid food is advantageous in terms of flavor, and taste, thereby promoting better hydration and nutrition. Employing clarified xanthan gum is also advantageous in appearance. The current commercially available products comprise starch and impart an off-flavor to many beverages. This discourages consumption of an adequate amount of liquids. Employing the preferred compositions of this invention encourages greater consumption of liquids by persons afflicted with dysphagia. Patients will drink more and thereby maintain adequate hydration. This improves the patient's health, happiness, and lifestyle.

Although the compositions of the present invention are most useful and advantageous to those with dysphagia, they have benefits in other areas. People who suffer from celiac's disease can not tolerate foods with gluten in it. Gluten typically comes from grains like wheat or corn and they can not use common household corn starch to thicken their foods like soup. Other thickeners are recommended. Also gluten-free recipes for breads and the like often specify the addition of xanthan gum due to its ability to keep breads moist. Again the most commonly available substitutes are powders, which are difficult at best to properly disperse and hydrate. Without proper dispersion and hydration, the effectiveness of these powders is limited. But the use of a thickener concentrate is extremely effective because the thickener is already completely dispersed and hydrated.

Children are often attracted to novelty treats. With the addition of sugar or other sweeteners, flavors, colors, and/or an insoluble novelty, in an aspect, the compositions of the present invention could be used as a novelty treat for children.

Although exemplary embodiments of processes are described herein, processes are not limited to such exemplary embodiments.

EXAMPLES OF THE INVENTION

Examples 1-33 following demonstrate that effective thickener concentrates can be prepared from different thickening agents.

In Examples 1-10 following, a 4% w/w solution of clarified xanthan gum from was prepared in water in the following manner. 22.47 g of clarified xanthan gum (composing of 89% clarified xanthan gum and 11% water) was added to 477.53 g of tap water under agitation. The solution was mixed for about one hour and no undissolved particles or fish eyes were visible.

In Examples 1-5 following, a 1% w/w solution of xanthan gum was, prepared by from the concentrate in the following manner: 50.0 g of 4% xanthan gum in water was added to 150.0 g of each fluid and agitated gently for less than 5 minutes. Each thickened liquid food was qualitatively analyzed to whether it was thick enough to be of honey consistency. All thickened liquid foods were visually appealing and tasted better than a control made with a competitive starch product.

| Example | Liquid Food | Honey Consistency? |
| --- | --- | --- |
| 1 | Tap Water | Yes |
| 2 | Apple Juice | Yes |
| 3 | Cranberry Juice | Yes |
| 4 | Orange Juice | Yes |
| 5 | Milk | Yes |

In Examples 6-10 following, the compositions of Examples 1-5 were mixed with an equal unthickened portion of the same liquid food and were qualitatively evaluated whether they were more of a honey or nectar consistency. All thickened liquid foods were visually appealing and tasted better than a control made with a commercially available starch product.

| | Liquid Food | Honey Consistency? | Nectar Consistency? |
| --- | --- | --- | --- |
| 6 | Tap Water | No | Yes |
| 7 | Apple Juice | No | Yes |
| 8 | Cranberry Juice | No | Yes |
| 9 | Orange Juice | No | Yes |
| 10 | Milk | No | Yes |

In Examples 11-18 following, a 4% thickener concentrate was prepared with clarified xanthan gum. The paste was divided into aliquots of 25 mL or 10 mL in plastic bags. The plastic bags were heat sealed and the packets were heat pasteurized. Packets were emptied into the fluid at a rate of one packet per 4 oz. of liquid food. Various agitation methods were tried and the consistency was subjectively evaluated. All thickened liquid foods were visually appealing and tasted better than a control made with a commercially available starch product.

| Example | Liquid Food | Packet Size | Agitation | Consistency |
| --- | --- | --- | --- | --- |
| 11 | Tap Water | 10 mL | Fork | Nectar |
| 12 | Tap Water | 25 mL | Fork | Honey |
| 13 | Tap Water | 10 mL | Shaking | Nectar |
| 14 | Tap Water | 25 mL | Shaking | Honey |
| 15 | Apple Juice | 25 mL | Shaking | Honey |

-continued

| Example | Liquid Food | Packet Size | Agitation | Consistency |
|---|---|---|---|---|
| 16 | Orange Juice | 25 mL | Shaking | Honey |
| 17 | Coffee | 10 mL | Fork | Nectar |
| 18 | Pepsi One | 25 mL | Shaking | Honey |

For Examples 19-26 following, a thickener concentrate of carboxymethycellulose sodium was prepared by admixing 10 g of carboxymethycellulose sodium with 490 g of tap water. The concentrate was admixed with a blender and allowed to stand for approximately 20 minutes. No undissolved particles were observed. Portions of the concentrate were admixed with water, apple juice, and cranberry juice cocktail for a few seconds with an electric blender. All admixtures were thickened after this mixing and no standing was required. Their consistency was then evaluated by their feel in the mouth and how they flowed when poured on a flat surface.

| Example | Amount of Concentrate (g) | Amount of liquid (g) | Liquid Food | Thickness |
|---|---|---|---|---|
| 19 | 10 | 120 | Water | Nectar |
| 20 | 12 | 120 | Apple Juice | Nectar |
| 21 | 15 | 120 | Cranberry Juice Cocktail | Nectar |
| 22 | 35 | 120 | Water | Honey |
| 23 | 75 | 120 | Water | Pudding |
| 24 | 41 | 120 | Apple Juice | Nectar |
| 25 | 60 | 120 | Apple Juice | Honey |
| 26 | 75 | 120 | Cranberry Juice Cocktail | Honey |

For Examples 27-33 following, a thickener concentrate of fine mesh guar gum was prepared by admixing 10 g of guar gum 390 g of tap water. The concentrate was admixed with a blender and allowed to stand for approximately 50 minutes. No undissolved particles were observed. Portions of the concentrate were admixed with water, apple juice, and cranberry juice cocktail for a few seconds with an electric blender. All admixtures were thickened after this mixing and no standing was required. Their consistency was then evaluated by their feel in the mouth and how they flowed when poured on a flat surface.

| Example | Amount of Concentrate (g) | Amount of liquid (g) | Liquid Food | Thickness |
|---|---|---|---|---|
| 27 | 30 | 120 | Water | Nectar |
| 28 | 75 | 120 | Water | Honey |
| 29 | 40 | 40 | Water | Pudding |
| 30 | 34 | 120 | Apple Juice | Nectar |
| 31 | 34 | 120 | Cranberry Juice Cocktail | Nectar |
| 32 | 80 | 120 | Cranberry Juice Cocktail | Honey |
| 33 | 60 | 90 | Apple Juice | Honey |

Example 34

This example demonstrates that the thickener concentrates of this invention have reduced changes in viscosity over time and tat they have less variability in final thickness. Eight ounces of honey consistency beverages were prepared with a commercially available starch thickener, Thick-It® starch thickener (Precision Foods, St. Louis, Mo. USA), by following the manufacturer's directions on the can. 5 tablespoons of powder was added to each beverage and mixed for a few seconds with a whisk. Each thickened liquid food was allowed to stand for at least 30 seconds. The thickened liquid foods were prepared in water, apple juice, cranberry juice cocktail, prune juice and orange juice.

A thickener concentrate was prepared with 3.75% clarified xanthan gum, 0.25% citric acid, 0.1% sodium benzoate, and 0.1% potassium sorbate. This was heat processed for shelf stability and packaged in 25 g aliquots into foil pouches. Nine months later, two of these packets were added to 8 oz. of each of water, apple juice, cranberry juice cocktail, prune juice and orange juice. They were mixed with a kitchen whisk for less than 90 seconds.

The viscosity of all thickened liquid foods was monitored with a Brookfield RV viscometer at 50 rpm with the appropriate spindle. The data were indexed to a viscosity of 100 at the time the beverage was ready for consumption. In the case of Thick-It® starch powder thickener, this was after the 30 seconds of standing. With the thickener composition prepared with xanthan gum, this was immediately after mixing was completed. The indexed viscosity data after 90 minutes is as follows:

|  | Thick-It® Starch Powder | Xanthan Concentrate |
|---|---|---|
| Apple Juice | 285.0 | 153.8 |
| Cranberry Juice Cocktail | 397.3 | 120.3 |
| Orange Juice | 270.8 | 129.2 |
| Prune Juice | 166.1 | 112.1 |
| Water | 185.7 | 101.5 |
| Mean | 261.0 | 123.4 |
| Standard Deviation | 92.1 | 19.8 |
| St. Dev as % of Mean | 35% | 16% |

When thickened with the compositions of the invention, the thickened liquid foods on average, increased in viscosity by only about 23%. When using Thick-It® starch powder thickener, the viscosity increased by over about 160%. The compositions of the invention show far less change in viscosity over time.

In addition, the standard deviation, a measure of the variability of the viscosities of the thickened liquid foods, was reduced more than in half as a % of the mean. The variation in viscosity of different thickened liquid foods when using the compositions of the present invention is reduced.

Example 35

The following example demonstrates the benefits of the preferred thickener concentrates in terms of preference, taste, and appearance. By improving these characteristics, patients will consume greater quantities of beverage.

In this Example, fourteen human patients of a long-term care facility were offered water and orange juice thickened with a commercial product, Thicken Right (Manufactured by Diamond Crystal Specialty Foods USA). In addition, they were offered water and orange juice thickened with compositions of the invention. A thickener concentrate was prepared with 3.75% clarified xanthan gum, 0.25% citric acid, 0.1% sodium benzoate, and 0.1% potassium sorbate. This was beat processed for shelf stability and packaged in either 10 g or 25 g aliquots in foil pouches. After three months, the packets were added to the liquid foods at a rate of one packet per 4 oz.

of liquid food and agitated with a whisk to achieve thickening. Patients on a nectar-consistency diet were given liquid foods thickened with the 10 g aliquots. Patients on a honey-consistency diet were given liquid foods thickened with the 25 g aliquots.

After evaluating the beverages in several characteristics, the patients were asked which product they preferred. Overall 21 of 28 times, liquid foods thickened with compositions of this invention were stated as the preferred liquid food. Thirteen respondents stated that they preferred the water thickened with the composition of this invention and 8 of 14 respondents preferred orange juice thickened with the composition of this invention. These results are statistically significant when analyzed with statistical software.

In addition, the patients' responses to various statements were recorded. Their responses were analyzed with a paired t-test with statistical software. The results showed statistically significant higher ratings for liquid foods thickened with compositions of the invention than those for Thicken Right. In no cases were Thicken Right thickened liquid foods rated higher that those thickened with compositions of the present invention. In such an analysis, the strength of the statistical significance is represented by the p-value. A lower p-value means stronger statistical significance. Typically, any p-value of 0.05 or less is considered statistically significant. The questions and the associated p-values were:
1. I would enjoy drinking this liquid food as part of my everyday diet. (p=0.002)
2. The liquid food taste was pleasing. (p=0.005)
3. The liquid food appears appetizing. (p=0.006)
4. The liquid food appearance was pleasing. (p=0.000)
5. The liquid food looks like it should. (p=0.006)
6. The liquid food looks like the consistency intended. (p=0.011)
7. The texture of this liquid food is smooth and palatable. (p=0.004)
8. The liquid food has no unappealing smells. (p=0.014)
9. The liquid food has no lumps. (p=0.008)
10. The texture of this liquid food looks smooth. (p=0.014)

This demonstrates the very strong appeal of the present compositions to dysphagia patients.

Example 36

In this example, fresh human breast milk was frozen, thawed and thickened. Thickened human breast milk compositions were prepared with two different thickeners. One was a xanthan gum thickener concentrate and the other was Thick-It® starch powder thickener. Four ounce samples of breast milk were mixed with the appropriate amount of each of the aforementioned thickeners to produce a honey-like physical consistency. Viscosity data was measured with a Brookfield RV viscometer at 50 rpm with the appropriate spindle as time progressed after preparation. The data are presented in Table A below, where A is the breast milk from human 1 and B is the breast milk from human 2.

TABLE A

| Time (hour:min:sec) | Viscosity (cP) | | | |
|---|---|---|---|---|
| | B Thick-It | A Thick-It | B Concentrate | A Concentrate |
| 0:01:00 | | 1,183 | 774 | 798 |
| 0:02:00 | 3,544 | 880 | — | — |
| 0:02:30 | | | 772 | 812 |
| 0:05:00 | 2,048 | 160 | 790 | 814 |

TABLE A-continued

| Time (hour:min:sec) | Viscosity (cP) | | | |
|---|---|---|---|---|
| | B Thick-It | A Thick-It | B Concentrate | A Concentrate |
| 0:07:30 | 968 | 57 | 804 | 820 |
| 0:10:00 | 434 | 46 | 800 | 820 |
| 0:12:30 | 234 | — | — | — |
| 0:15:00 | 113 | — | 812 | 840 |
| 0:17:30 | 64 | — | — | — |
| 0:20:00 | 49 | — | — | — |
| 0:30:00 | — | — | 826 | 848 |
| 0:45:00 | — | — | 820 | 848 |
| 1:00:00 | — | — | 822 | 842 |

With Thick-It® starch powder thickener, the viscosity of the breast milk from B decreased by 98.6% in 20 minutes and the viscosity of breast milk from A decreased by 96.1% in 10 minutes. With the thickener concentrate, the viscosity of the breast milk from B increased 6.2% in 60 minutes and the viscosity of the breast milk from A increased 5.5% in 60 minutes.

Figure 2:
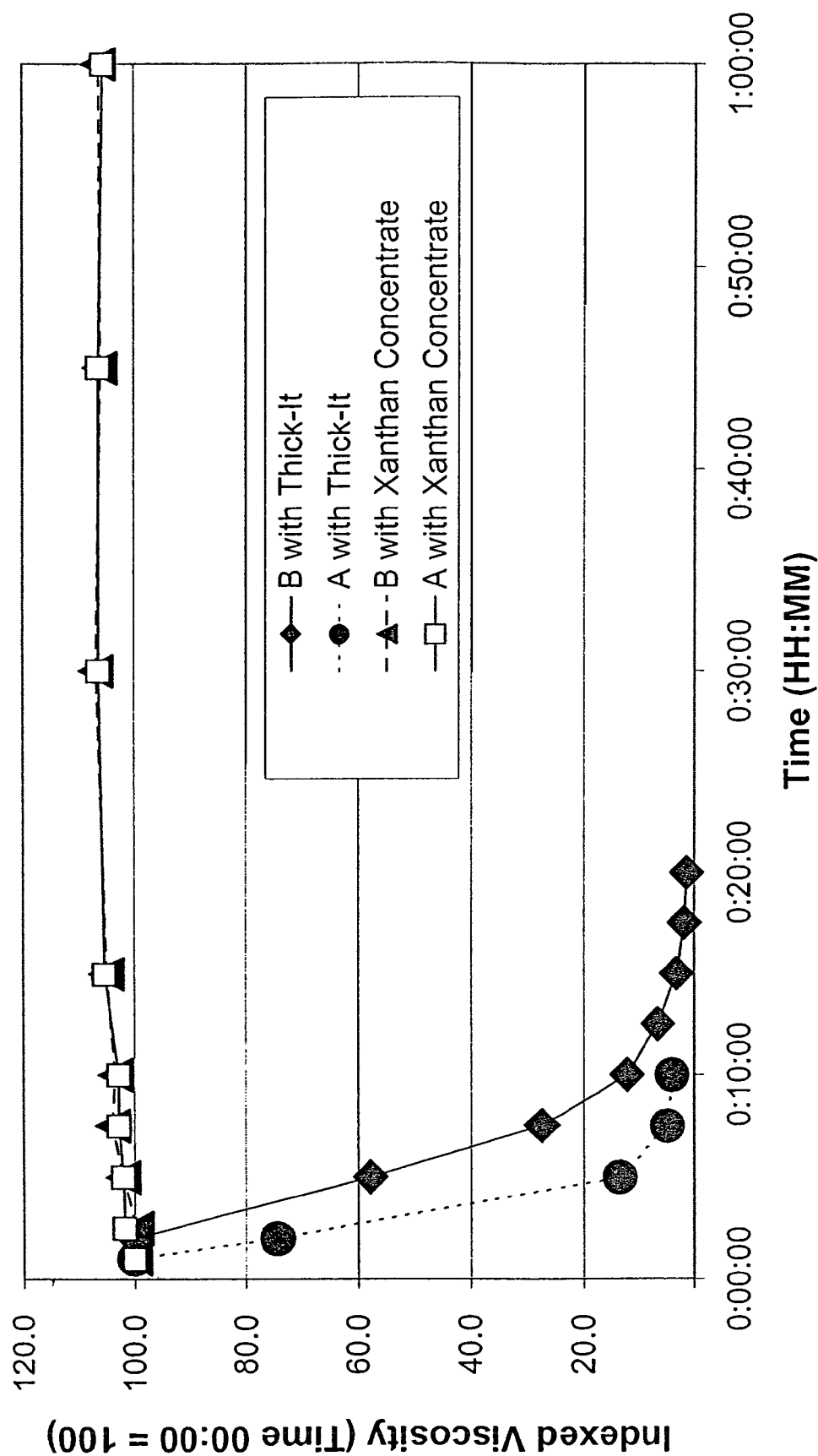
FIG. 2 graphically illustrates changes in indexed viscosity as a function of time for human breast milk thickened with a currently available commercial product and a composition of the present invention.

FIG. 2 shows the actual viscosity data. The FIG. 3 shows the effects when the results are indexed to the viscosity at time 00:00=100.

Example 36

To further demonstrate the effectiveness of the xanthan thickener concentrate in human breast milk, the samples from Example 35 35 thickened with the xanthan concentrate were frozen. Six days later, the frozen samples were allowed to thaw in a refrigerator. Two days later they were warmed to room temperature and their viscosity was measured again. The samples showed no signs of separation when the samples were opened. The viscosity of the B breast milk thickened with the xanthan concentrate was 868 cP and the A breast milk thickened with the xanthan concentrate was 920 cP. (cP=centipoise.)

The xanthan gum thickener concentrate thickens human breast milk and maintains the thickness without significant changes in consistency. This is true even when frozen for six days and refrigerated for another two days. This is a dramatic improvement over existing technology where thickness is not maintained for even 20 minutes.

Examples 37 and 38 demonstrate that the improved taste and appearance of a xanthan gum concentrate increases the quantity of fluid consumed by dysphagia patients and dramatically improves their quality of life and their health.

Example 37

A 78-year old Parkinson's patient with a history of nearly a year of nearly continuous lung infections had been advised to thicken his liquid foods to avoid future infections. Because of he found powder thickeners unpalatable, he was consuming virtually no liquid foods. This led to poor oral hygiene, which led with rapid bacteria growth in the mouth, and thick stringy saliva. The bacteria in the mouth was the suspected source of the lung infections.

A thickener concentrate was prepared with 3.75% clarified xanthan gum, 0.25% citric acid, 0.1% sodium benzoate, and 0.1% potassium sorbate. This was heat processed for shelf stability and packaged in 10 g aliquots into foil pouches. Initially water and iced tea was thickened at a rate of one 10 g packet per 4 oz of beverage. Later, the composition was added to whatever beverage the patient wanted to consume.

Within 3 days of first being offered liquid foods thickened with the above composition, the patient was drinking 2 quarts of water per day. The patient has not had any new infections within 4 months of follow up.

Example 38

After a series of respiratory infections were linked to aspiration of liquid foods, a 5 year old boy was placed on a diet with all liquid foods thickened. However, he would not drink beverages prepared with powdered starches for two reasons. First he reported that he hated the taste. Second, he reported that he hated the powder lumps. Because he would not drink thickened liquid foods, his growth and nutritional status suffered. He was first fitted with a naso-gastric tube to provide sufficient liquid foods and to supplement his solids. Eventually a gastrostomy tube was inserted. For over a year, he was fed liquid foods through the gastrostomy tube 3-5 times per day to ensure proper hydration and nutrition. During this time, he would not drink liquid foods thickened with commercially available powders.

A thickener concentrate was prepared with 3.75% clarified xanthan gum, 0.25% citric acid, 0.1% sodium benzoate, and 0.1% potassium sorbate. This was heat processed for shelf stability and packaged in 25 g and 10 g in foil pouches.

Approximately 5 months after preparation, the 25 g pouches were used to thicken liquid foods for the boy to honey-consistency by adding them at a rate of one pouch for every 4 oz of liquid food. He began to drink thickened liquid foods orally and his dependence on tube feedings began to decrease.

After approximately 1 month, a new modified barium swallow was conducted that concluded he could progress to nectar-consistency fluids. At this point he began using the 10 g pouches at a rate of one pouch per 4 oz of liquid food. He continued to increase his oral liquid food intake and decrease his need for supplementation through his tube.

After approximately another 4-6 weeks, supplementation through his tube was no longer necessary and the tube was removed. At last contact, he continues to have all his liquid foods thickened with the compositions of the present invention and continues to consume sufficient liquid foods orally.

While the invention has been described in terms of various specific embodiments, those skilled in the art will recognize that the invention can be practiced with modification within the spirit and scope of the claims.

What is claimed is:

1. A treatment for dysphagia which comprises admixing a packaged aqueous concentrate thickener composition with a liquid food that is suitable for consumption by a person without dysphagia, and then feeding the thickened liquid food to a patient having the condition of dysphagia, to facilitate consumption of the liquid food by the patient, said packaged aqueous concentrate thickener composition consisting essentially of a fully hydrated thickener and water.

2. A treatment in accordance with claim 1 wherein said thickener comprises at least one member selected from the group consisting of sodium alginate, potassium alginate, ammonium alginate, carrageenan, guar gum, carob bean gum, sodium carboxymethylcellulose, hydroxypropyl cellulose, hydroxypropyl methyl cellulose, food starches, and xanthan gum.

3. A treatment in accordance with claim 2 wherein said thickener comprises at least one member selected from the group consisting of carrageenan, guar gum, sodium carboxymethylcellulose, and xanthan gum.

4. A treatment in accordance with claim 1 wherein the concentrate thickener composition is a liquid which consists essentially of xanthan gum, water, and a preservative.

5. A treatment in accordance with claim 1 wherein said liquid food comprises at least one member selected from the group consisting of milk, soda, coffee, tea, juice, water, beer, wine, liquid medication, and nutritional supplement.

6. A treatment in accordance with claim 1 wherein the liquid food is a food with a substantial amount of unbound liquid.

7. A treatment in accordance with claim 6 wherein the food with a substantial amount of unbound liquid is selected from the group consisting of broths, soups, stews, purees of solid food and a liquid, and purees of high liquid content foods.

8. A treatment in accordance with claim 1 wherein said concentrate thickener composition comprises about 2% to about 5% xanthan gum.

9. A treatment in accordance with claim 8 wherein said concentrate thickener composition comprises about 3.5% to about 4.5% xanthan gum.

10. A treatment in accordance with claim 9 wherein said concentrate thickener composition comprises about 3.6% to about 4.3% xanthan gum.

11. The treatment of claim 1 wherein the composition includes a non-substantial amount as relates to thickening of at least one component selected from the group consisting of acids, bases, acidulates, chelating agents, flavors, colors, vitamins, minerals, sweeteners, insoluble foods and preservatives.

12. A treatment in accordance with claim 1 wherein said concentrate thickener composition comprises about 1% to about 10% by weight of thickener.

13. A process for treating a patient having the condition of dysphagia at the patient's locale, said process comprising admixing a packaged aqueous concentrate thickener composition with a liquid food at said locale, and then feeding the thickened liquid food to the patient to facilitate consumption of the food by the patient, said packaged aqueous concentrate thickener composition consisting essentially of a fully hydrated thickener and water.

14. A process in accordance with claim 13 wherein said thickener comprises at least one member selected from the group consisting of sodium alginate, potassium alginate, ammonium alginate, carrageenan, guar gum, carob bean gum, sodium carboxymethylcellulose, hydroxypropyl cellulose, hydroxypropyl methyl cellulose, food starches, and xanthan gum.

15. A process in accordance with claim 14 wherein said thickener comprises at least one member selected from the group consisting of carrageenan, guar gum, sodium carboxymethylcellulose, and xanthan gum.

16. A process in accordance with claim 15 wherein said thickener is xanthan gum.

17. A process in accordance with claim 16 wherein said concentrate thickener composition comprises about 2% to about 5% xanthan gum.

18. A process in accordance with claim 17 wherein said concentrate thickener composition comprises about 3.5% to about 4.5% xanthan gum.

19. A process in accordance with claim 18 wherein said concentrate thickener composition comprises about 3.6% to about 4.3% xanthan gum.

20. A treatment for dysphagia which comprises preparing an aqueous concentrate thickener composition consisting essentially of a fully hydrated thickener and water, packaging said aqueous concentrate thickener, sending said packaged aqueous concentrate thickener to a locale of a person with dysphagia; admixing said prepared aqueous concentrate thickener composition with a liquid food to thicken the food to facilitate its consumption by the person with dysphagia, and feeding the thickened liquid food to said person.

21. A treatment in accordance with claim 20 wherein the food is a serving of a liquid food that is suitable for consumption by a person without dysphagia prior to admixing with the prepared aqueous concentrate thickener.

22. A treatment in accordance with claim 20 wherein said aqueous concentrate thickener composition comprises at least one member selected from the group consisting of carrageenan, guar gum, carboxymethylcellulose sodium, and xanthan gum.

23. A treatment in accordance with claim 20 wherein the aqueous concentrate thickener composition is a liquid which consists essentially of xanthan gum and water.

24. A treatment in accordance with claim 23 wherein the xanthan gum comprises about 2% to about 5% of the aqueous concentrate thickener composition.

25. A treatment in accordance with claim 20 wherein the composition includes a non-substantial amount as relates to thickening of at least one component selected from the group consisting of acids, bases, acidulates, chelating agents, flavors, colors, vitamins, minerals, sweeteners, insoluble foods and preservatives.

26. A treatment in accordance with claim 20 wherein said concentrate thickener composition comprises about 1% to about 10% by weight of thickener.

* * * * *

UNITED STATES PATENT AND TRADEMARK OFFICE
CERTIFICATE OF CORRECTION

PATENT NO. : 7,638,150 B2  Page 1 of 1
APPLICATION NO. : 10/485879
DATED : December 29, 2009
INVENTOR(S) : John L. Holahan It is certified that error appears in the above-identified patent and that said Letters Patent is hereby corrected as shown below:

Title Page, (73)

Replace "Simply Thick LLP"

With -- Simply Thick, LLC --

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,638,150 B2 | Page 1 of 1 |
| APPLICATION NO. | : 10/485879 | |
| DATED | : December 29, 2009 | |
| INVENTOR(S) | : Holahan | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 889 days.

Delete the phrase "by 889 days" and insert -- by 983 days --

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,638,150 B2 | Page 1 of 1 |
| APPLICATION NO. | : 10/485879 | |
| DATED | : December 29, 2009 | |
| INVENTOR(S) | : John L. Holahan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,103 days.

Signed and Sealed this
Twenty-seventh Day of May, 2014

Michelle K. Lee
*Deputy Director of the United States Patent and Trademark Office*